(12) United States Patent
Matsukawa et al.

(10) Patent No.: US 8,063,310 B2
(45) Date of Patent: Nov. 22, 2011

(54) ELECTRONIC DEVICE AND HARNESS FOR WIRING ELECTRONIC DEVICES

(75) Inventors: Takashi Matsukawa, Sakura (JP); Yuuki Tanaka, Sakura (JP); Kazuo Tanihira, Sakura (JP); Tamaki Tanihira, legal representative, Sakura (JP); Shigeru Ashida, Sakura (JP); Kiyoshi Kuzuu, Sakura (JP); Kensuke Yoshida, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/024,517

(22) Filed: Feb. 1, 2008

(65) Prior Publication Data

US 2008/0185168 A1 Aug. 7, 2008

(30) Foreign Application Priority Data

Feb. 5, 2007 (JP) ................. 2007-025507
Oct. 16, 2007 (JP) ................. 2007-268857

(51) Int. Cl.
*H01B 7/08* (2006.01)

(52) U.S. Cl. .................................... 174/117 F

(58) Field of Classification Search ............... 174/117 F, 174/117 FF
See application file for complete search history.

(56) References Cited

U.S. PATENT DOCUMENTS

| | | | | |
|---|---|---|---|---|
| 4,874,908 A * | 10/1989 | Johansson | ........... | 174/72 A |
| 6,765,150 B2 * | 7/2004 | Hsieh | ........... | 174/117 F |
| 6,797,891 B1 * | 9/2004 | Blair et al. | ........... | 174/268 |
| 6,886,914 B2 * | 5/2005 | Hiramoto et al. | ........... | 347/50 |
| 7,297,872 B2 * | 11/2007 | Morijiri | ........... | 174/88 C |
| 2003/0085953 A1 | 5/2003 | Hiramoto et al. | | |
| 2004/0026115 A1 * | 2/2004 | Shaw | ........... | 174/117 F |
| 2005/0183881 A1 * | 8/2005 | Hirata et al. | ........... | 174/117 F |
| 2006/0157267 A1 * | 7/2006 | Morijiri | ........... | 174/117 F |

FOREIGN PATENT DOCUMENTS

| | | |
|---|---|---|
| JP | 57-154229 U | 9/1982 |
| JP | S58-103492 | 7/1983 |
| JP | 1-185113 A | 7/1989 |
| JP | 3-32312 A | 2/1991 |
| JP | 06-078439 A | 3/1994 |
| JP | 07-221823 A | 8/1995 |
| JP | 11-25763 A | 1/1999 |
| JP | 2000-245026 A | 9/2000 |
| JP | 2000-277226 A | 10/2000 |
| JP | 2003-323824 A | 11/2003 |
| JP | 2004-127773 A | 4/2004 |
| JP | 2005-141923 A | 2/2005 |
| JP | 2005-235690 A | 2/2005 |
| JP | 2005-141923 A | 6/2005 |

(Continued)

OTHER PUBLICATIONS

European Search Report Nov. 18, 2010 for Application No. 08250386.3-1231/1953768.

*Primary Examiner* — Chau N Nguyen
(74) *Attorney, Agent, or Firm* — Sughrue Mion, PLLC

(57) ABSTRACT

An electronic device includes at least first and second enclosures mounted so as to enable relative displacement therebetween, and an electric wire which electrically connects a circuit of the first enclosure and a circuit of the second enclosure. The electric wire includes a tape-shaped flat cable, including a plurality of internal wires arranged in parallel in a row.

16 Claims, 13 Drawing Sheets

FOREIGN PATENT DOCUMENTS

| | | |
|---|---|---|
| JP | 2005-235690 A | 9/2005 |
| JP | 2005-285696 A | 10/2005 |
| JP | 2005-317334 A | 11/2005 |
| JP | 2005-322462 A | 11/2005 |
| JP | 2006-505341 A | 2/2006 |
| JP | 2006-093998 A | 4/2006 |
| JP | 2006-210299 A | 8/2006 |
| JP | 2006-222059 A | 8/2006 |
| JP | 2006-331816 A | 12/2006 |
| KR | 1020040028176 A | 4/2004 |
| KR | 10-2004-0103088 A | 12/2004 |
| KR | 20-0419714 Y1 | 6/2006 |
| WO | 2005/112405 A1 | 11/2005 |
| WO | 2006/112098 A1 | 10/2006 |

* cited by examiner

ELECTRONIC DEVICE AND HARNESS FOR WIRING ELECTRONIC DEVICES

CROSS-REFERENCE TO RELATED APPLICATIONS

This application claims priority from Japanese Patent Application No. 2007-25507, filed on Feb. 5, 2007, and Japanese Patent Application No. 2007-268857, filed on Oct. 16, 2007, the contents of which are incorporated herein by reference.

BACKGROUND OF THE INVENTION

1. Field of the Invention

Apparatuses consistent with the present invention relate to electronic devices such as portable telephones, portable personal computers, and the like, in which a plurality of enclosures having circuits are installed so as to enable relative displacement, and the circuits within these enclosures are electrically connected by means of micro-coaxial cables or other wiring, as well as to a harness for use in wiring between enclosures of such electronic devices.

2. Description of the Related Art

In recent years, electronic devices such as portable telephones have made rapid advances toward compactness, lighter weight, and greater functionality. Current technical trends include an increased demand for micro-coaxial cable assemblies in place of flexible printed circuit boards (hereafter referred to as "FPCs") as internal wiring members of portable telephones. This is due to the fact that the transmission characteristics and noise resistance of micro-coaxial cables is well-suited to marked demands. Further, wiring methods are being sought which enable use even in mechanical constructions which had previously been regarded as ill-suited to micro-coaxial cables.

Conventional micro-coaxial cable assemblies have been adopted in place of FPCs as internal wiring members of portable telephones. The mechanical construction of portable telephones in which micro-coaxial cable assemblies are used include the open-close construction called a "clamshell" type device as shown in FIG. 13A; the rotating construction called a "jackknife" type device as shown in FIG. 13B; and a dual-axis construction enabling both rotation and opening/closing called a "twist" type device as shown in FIG. 13C. However, there has been no use of micro-coaxial cable assemblies in a parallel-displacement construction called a "sliding" type device such as shown in FIG. 13D.

Characteristics sought in a sliding-type construction include horizontal flexing in a space 3 mm in height. In the related art, only FPCs, with a thin-sheet construction, have been compatible with such a construction. FIG. 14 illustrates an example of a case of application of an FPC 4 as a member for wiring between enclosures of a sliding-type electronic device 1. In this electronic device 1, the circuits of a first enclosure 2, and of a second enclosure 3 slidably mounted on the first enclosure 2, are electrically connected by the FPC 4.

Examples of technology related to multi-core cables used in micro-coaxial cable assemblies and the like are disclosed in Japanese Unexamined Patent Applications, First Publication Nos. 2005-235690 and 2005-141923.

Japanese Unexamined Patent Application, First Publication No. 2005-235690, discloses a multi-core cable wherein both end portions of a plurality of conductors are arranged in a flat shape with a prescribed pitch, and the central portion is bundled into a single cable.

Japanese Unexamined Patent Application, First Publication No. 2005-141923, discloses a multi-core cable wherein a weft is woven among a plurality of conductors, and by means of contraction of the weft, the conductors are bundled into an approximately round shape.

However, the above technologies of the related art have the following problems.

As shown in FIG. 14, in a sliding-type electronic device employing FPCs as wiring members between enclosures, transmission characteristics and noise resistance are inadequate. Further, because the FPC is flexed in a small space, there is the possibility that creases and bending may occur in the FPC, which may worsen the transmission characteristics.

As previously explained, if a micro-coaxial cable is used as a wiring member between enclosures in a sliding-type electronic device, transmission characteristics and noise resistance may be improved compared with cases in which FPCs are used as wiring members. However, the harness constructions of the related art disclosed in Japanese Unexamined Patent Application, First Publication No. 2005-235690 and No. 2005-141923 are used in clamshell-type and jackknife-type constructions, and cannot be applied to sliding-type constructions. The harness constructions of the related art are constructions in which a plurality of cables are bundled, and so the 3 mm height of flexing space required by sliding-type constructions cannot be maintained.

FIG. 15 is a reference diagram showing the wiring structure in a sliding-type electronic device of the related art. Sliding-type electronic device 5 comprises a first enclosure 6 having a first connection portion 8, and a second enclosure 7 slidably mounted on the first enclosure 6 having a second connection portion 9. In sliding-type electronic device 5, each connection portion is provided such that the wires connecting the first connection portion 8 and second connection portion 9 are parallel to the direction of enclosure displacement 10 (the enclosure sliding direction). When a harness (not shown) is used as the wiring member between enclosures, wiring is performed at the harness wiring position indicated by the symbol 10A.

In general, micro-coaxial cables used in portable telephones range from American Wire Gauge (AWG) 46 to AWG 42 where the cable external diameter is approximately 0.2 mm to 0.3 mm. The flexing spaces used in sliding-type constructions generally have a height of approximately 3 mm, so that flexing resistance of approximately 100,000 cycles or more is required.

In general, the allowable bending radius of micro-coaxial cables must be a bending radius equal to approximately 20 times the conductor diameter. When the cable diameter is approximately 0.2 mm to 0.3 mm, and is for example 0.25 mm, an allowable bending radius of approximately 5 mm is required. Thus, the 3 mm flexing space required for general sliding-type constructions would not be not satisfied.

Further, related art harnesses disclosed in Japanese Unexamined Patent Application, First Publication No. 2005-235690 and in Japanese Unexamined Patent Application, First Publication No. 2005-141923, numerous cables are bundled together, and these are connected at the wiring position indicated by the symbol 10A in FIG. 15. When the enclosure 7 is slid, flexing results in the space of a height of 3 mm so that the cable is creased and flexing resistance performance is further decreased.

Maintaining the required flat shape of the harness cables presents other problems. For example, when a harness configured without a bundling member is flexed, the flat shape cannot be preserved due to cable creasing and stretching.

SUMMARY OF THE INVENTION

Exemplary embodiments of the present invention provide a sliding-type electronic device enabling use of a micro-coaxial cable assembly in a space of a height of 3 mm or less, and a wiring harness used as such a wiring member in the electronic device.

An exemplary embodiment of the present invention provides an electronic device including at least a first enclosure and a second enclosure mounted so as to enable relative displacement therebetween, and an electric wire which electrically connects a circuit of the first enclosure and a circuit of the second enclosure, wherein the electric wire includes a tape-shaped flat cable, including a plurality of internal wires arranged in parallel in a row.

Hereafter in the present invention, "internal wires" refers to electrical wires used within a flat cable.

In an electronic device of the present invention, at least one of the internal wires may be a micro-coaxial cable.

In an electronic device of the present invention, the flat cable may be bent in a U-shape and disposed at a surface along which the first enclosure is slidable with respect to the second enclosure.

In an electronic device of the present invention, the electric wire may include a plurality of tape-shaped flat cables superposed in a plurality of layers.

In an electronic device of the present invention the plurality of superposed flat cables may be bent in a U-shape and disposed at a surface along which the first enclosure is slidable with respect to the second enclosure.

In an electronic device of the present invention, in the portion of the flat cables bent into a U-shape, the internal wires may be arranged in a row along a direction substantially perpendicular to the surface.

In an electronic device of the present invention, the flat cable may further include a cover, covering the internal wires together in tape form.

In an electronic device of the present invention, the flat cable may further include a resin covering member, covering the internal wires together.

In an electronic device of the present invention, the flat cable may further include a pair of resin tapes, wherein the plurality of internal wires, arranged in a parallel row, are enclosed together between the pair of resin tapes.

In an electronic device of the present invention, the flat cable may further include a resin binding fiber woven with the plurality of internal wires, thus binding the internal wires together.

In an electronic device of the present invention, the lengths of the plurality of internal wires may be equal.

In an electronic device of the present invention, when a plurality of flat cables are stacked and superposed in a plurality of layers, first internal wires on a first side of the electric wire may have a length shorter than second wires on a second side of the electric wire, and internal wires disposed between the first side and the second side may have lengths increasing from the first side to the second side.

Further, an exemplary embodiment of the present invention provides a harness for wiring electronic devices, in which a connection portion is provided for an end portion of a tape-shape flat cable formed with a plurality of internal wires arranged in a parallel row, and which is used as a wiring member in an electronic device.

By means of an exemplary embodiment of the present invention, a sliding-type electronic device may be provided in which a micro-coaxial cable assembly may be employed in a space of a height of 3 mm or less.

By using a method of an exemplary embodiment of the present invention, a micro-coaxial cable assembly may be employed in a sliding-type electronic device, so that compared with the use of FPCs as wiring members between enclosures as in the related art, transmission characteristics and noise resistance may be improved.

Further, by using a flat cable in which numerous wires are arranged in a parallel row in tape form and covered together, wire breaking due to friction between cables may be eliminated. Also, by using a flat cable, regular cable bundling is realized, and cable wiring may be facilitated.

DETAILED DESCRIPTION OF EXEMPLARY EMBODIMENTS OF THE INVENTION

Hereafter, the present invention will be described in detail by explaining embodiments of the invention with reference to the attached drawings.

Figure 1:
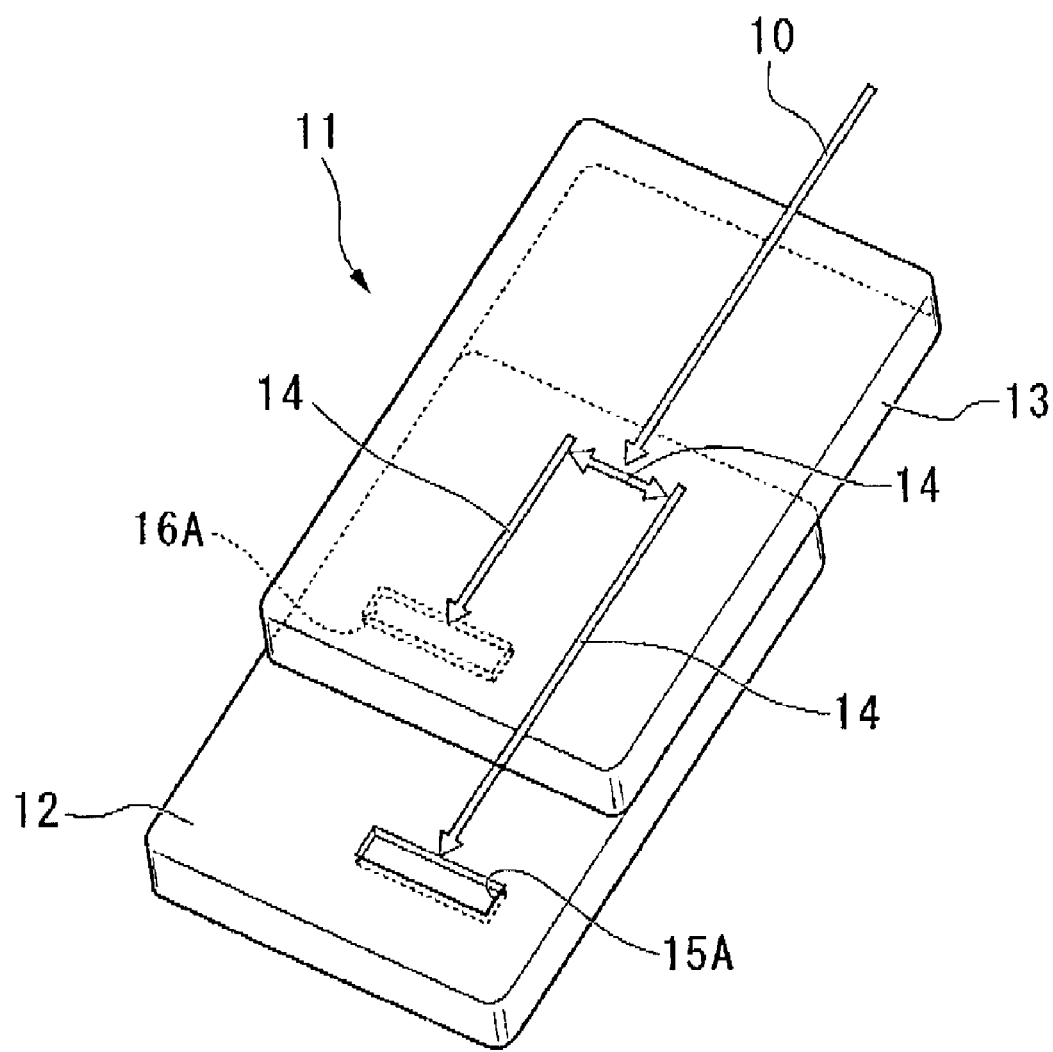
FIG. 1 is a perspective view showing an embodiment of an electronic device of the invention.
Figure 2A:
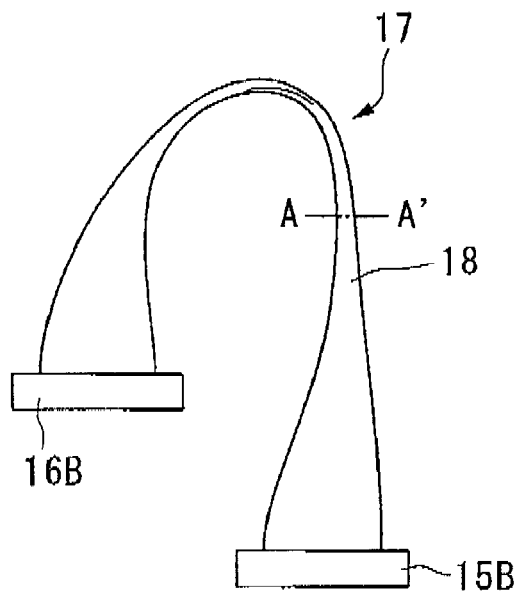
FIG. 2A is a front view showing an example of a wiring harness for an electronic device.
Figure 2C:
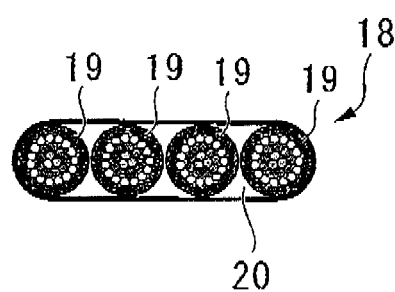
FIG. 2C is a cross-sectional view of the cable constituting the portion shown in FIG. 2B.
Figure 2B:
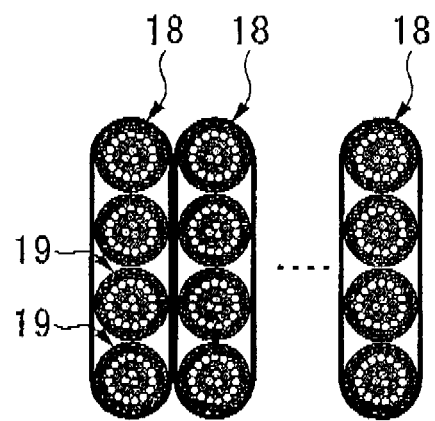
FIG. 2B is a cross-sectional view of portion A-A' in FIG. 2A.

FIG. 1 is a perspective view showing an electronic device of an exemplary embodiment of the present invention. FIGS. 2A-C illustrate an exemplary embodiment of a harness for wiring electronic devices (hereafter, simply referred to as "harness") employed in this electronic device 11. FIG. 2A is a front view, FIG. 2B is a cross-sectional view along portion A-A' in FIG. 2A, and FIG. 2C is a cross-sectional view of cables constituting the portion shown in FIG. 2B. In these figures, the symbol 10 denotes the enclosure sliding direction, 11 denotes the sliding-type electronic device, 12 denotes the first enclosure, 13 denotes the second enclosure, 14 denotes the harness wiring position, 15A denotes a first connection portion on the enclosure side, 15B denotes a first connection portion on the harness side, 16A denotes a second connection portion on the enclosure side, 16B is a second connection portion on the harness side, 17 denotes the harness, 18 denotes a flat cable, 19 denotes a micro-coaxial cable, and 20 denotes a resin covering member (hereafter called a "sheath").

The electronic device 11 of an exemplary embodiment is characterized in that two enclosures 12 and 13 having circuits are slidably mounted, and the circuits within these enclosures 12 and 13 are electrically connected by a harness 17. The harness 17 has connection portions 15B and 16B at both ends of a tape-shape flat cable 18 obtained by arranging numerous micro-coaxial cables 19 parallel in a row and covering together with a covering 20. The connection portions 15A and 16A of the enclosures with the harness are placed in positions such that the line connecting these connection portions 15A and 16A is not parallel to the direction of enclosure displacement 10.

In an exemplary embodiment of the present invention, as shown in FIG. 2C, the harness 17 is obtained by arranging in a parallel row numerous (in the example of FIG. 2C, four) micro-coaxial cables 19, each comprising a central conductor, an inner insulating layer surrounding the conductor, an outer conductor surrounding the inner insulating layer, and an outer covering surrounding the outer conductor, and by covering the cables with a sheath 20 of ultraviolet-curing resin, fluoride resin, or similar to form a tape shape. In this exemplary embodiment, the harness 17 utilizes numerous micro-coaxial cables 19, and are covered together. However, harnesses of the present invention are not limited to this example, and electric power wires or other electric wires other than coaxial cables may be combined with micro-coaxial cables to form a harness. Moreover, no limitations are placed on the combination of the types of micro-coaxial cables 19 used, the direction of winding of the outer conductor, or the like.

In the exemplary embodiment of the present, no limitations in particular are placed on the sliding construction between the first enclosure 12 and second enclosure 13, or on the circuits mounted therein; and sliding constructions, enclosure constructions, and circuits may be selected as appropriate from among those used in portable telephones known in the related art, portable personal computers, portable game devices, electronic dictionaries, and various other electronic devices. The electronic device of this embodiment is not limited to sliding-type electronic devices 11, and application is possible to electronic devices in which a plurality of enclosures having circuits are mounted so as to enable relative sliding, and the circuits within these enclosures are electrically interconnected by means of electric wires. For example, application to the portable telephone types shown in FIGS. 13A-D is possible.

Further, in the electronic device 11 of this embodiment, the connection portions 15A and 16A of the enclosures 12 and 13 for connection with the harness are placed in a position such that the line connecting these connection portions 15A and 16A is not parallel with the enclosure displacement direction 10. Thus, when the connection portions 15B and 16B of the harness 17 shown in FIGS. 2A-C are connected to connection portions 15A and 16A, the harness 17 is placed in the harness wiring position 14 shown in FIG. 1 and the enclosures are electrically connected. When the enclosure 13 is slid, the micro-coaxial cables 18 of the harness 17 can be flexed with a radius of curvature larger than in the case of the wiring pattern in FIG. 15.

Figure 15:
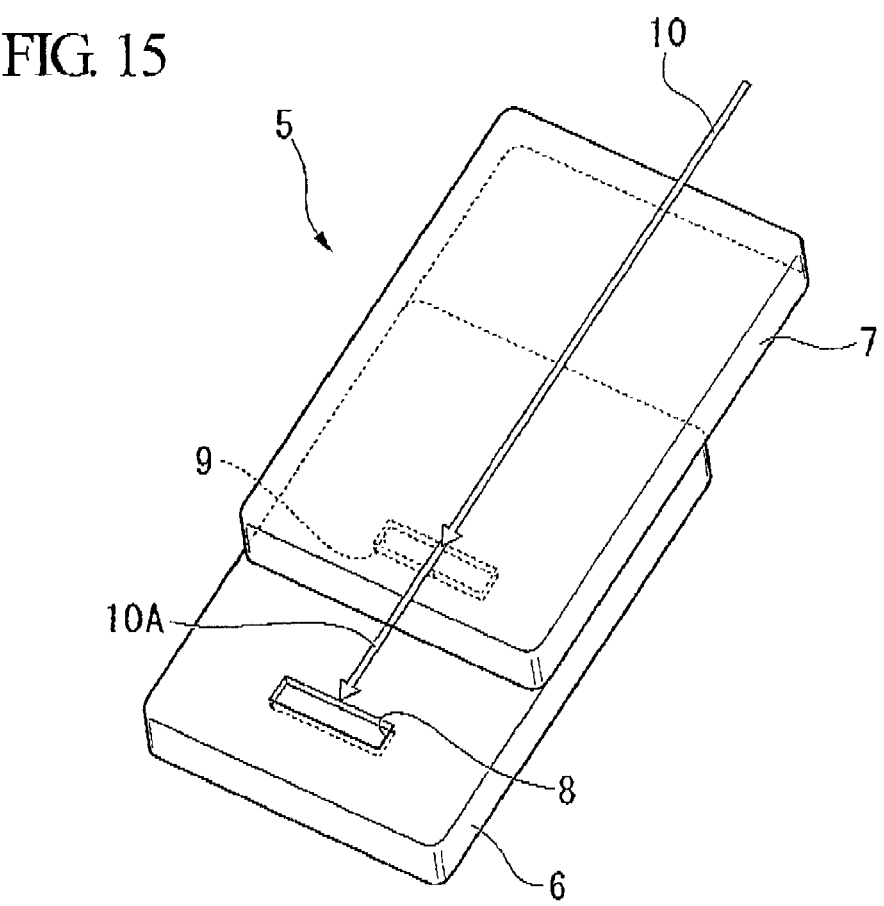
FIG. 15 is a perspective view showing a conventional wiring state using as a harness a wiring member between enclosures, in a sliding-type electronic device.

In the wiring pattern shown in FIG. 15, the enclosure displacement direction 10 and the line connecting the connection portions 8, 9 are parallel, so that when the harness is wired and the enclosures are slid, the cable radius of the curvature is limited by the space between the enclosures. If this space is small, however, the harness cannot be flexed.

On the other hand, in an exemplary embodiment of the present invention shown in FIG. 1, the harness 17 is placed in the harness wiring position 14 shown in FIG. 1, so that the micro-coaxial cables 18 of the harness 17 are placed in a U-shape at the displacement surface (hereafter called the "sliding surface"), and flexing with a large radius of curvature is possible upon enclosure sliding.

As a result, in the sliding-type electronic device 11 of this embodiment, a micro-coaxial cable harness can be used in a space with a height of 3 mm or less.

In this way, an exemplary embodiment of the present invention enables use of a micro-coaxial cable assembly, so that compared with devices using a conventional FPC as a wiring member between enclosures, transmission characteristics and noise resistance can be improved.

Further, by performing wiring between enclosures using a harness 17 having flat cables 18, obtained by arranging numerous micro-coaxial cables 19 in parallel in a row in tape form and covering the cables together, wire breaking due to friction between cables can be eliminated.

Figure 3A:
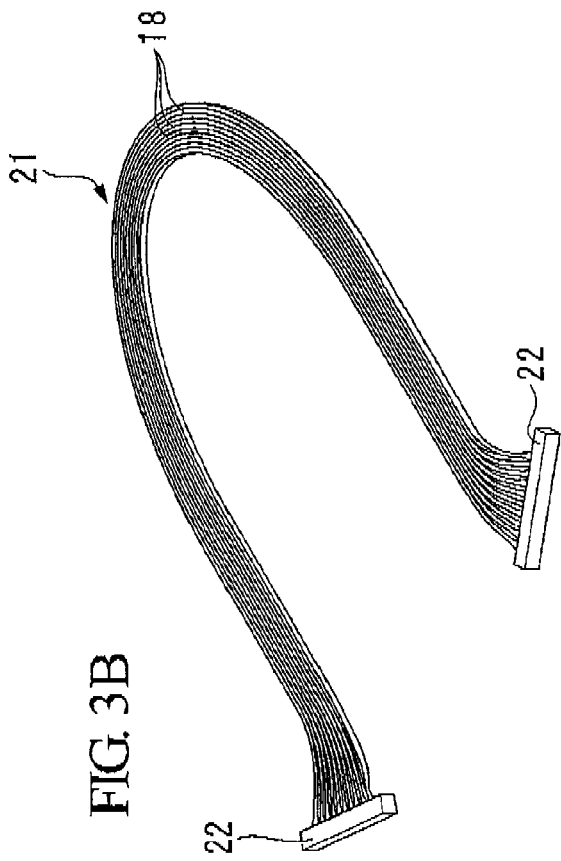
FIG. 3A is a top view of a harness 21, in which are staked a plurality of layers of flat cables 18, of this embodiment.
Figure 3B:
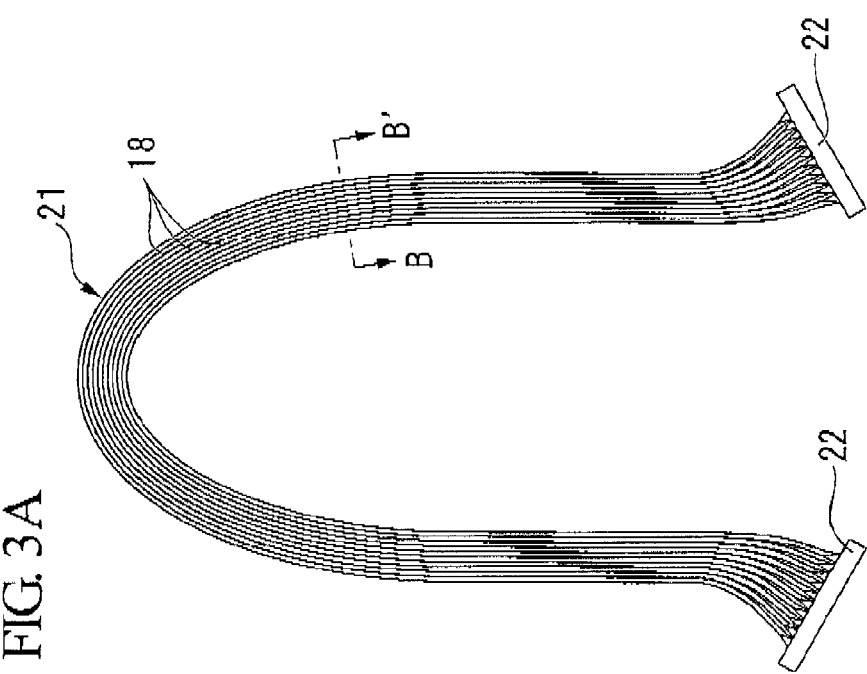
FIG. 3B is a perspective view of the harness 21 of FIG. 3A.
Figure 3C:
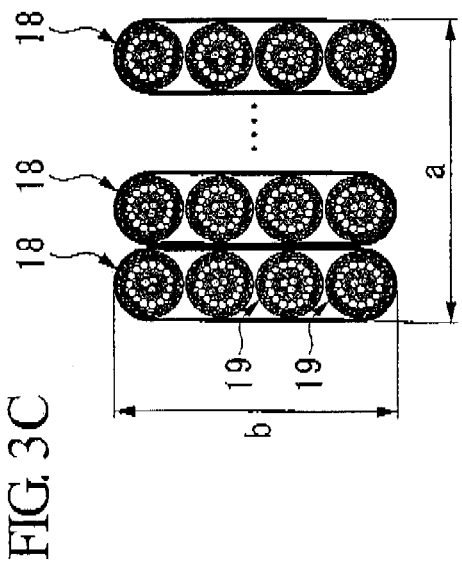
FIG. 3C is a cross-sectional view along line B-B' in FIG. 3A.
Figure 4A:
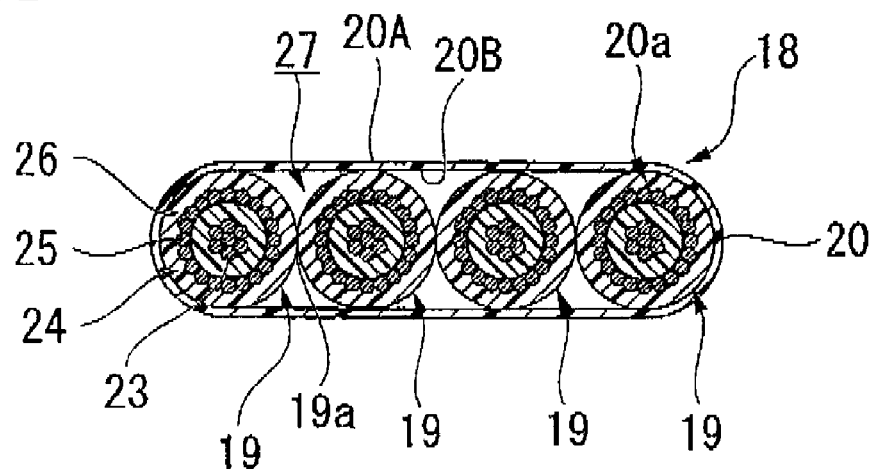
FIG. 4A is a cross-sectional view of a flat cable 18.
Figure 4B:
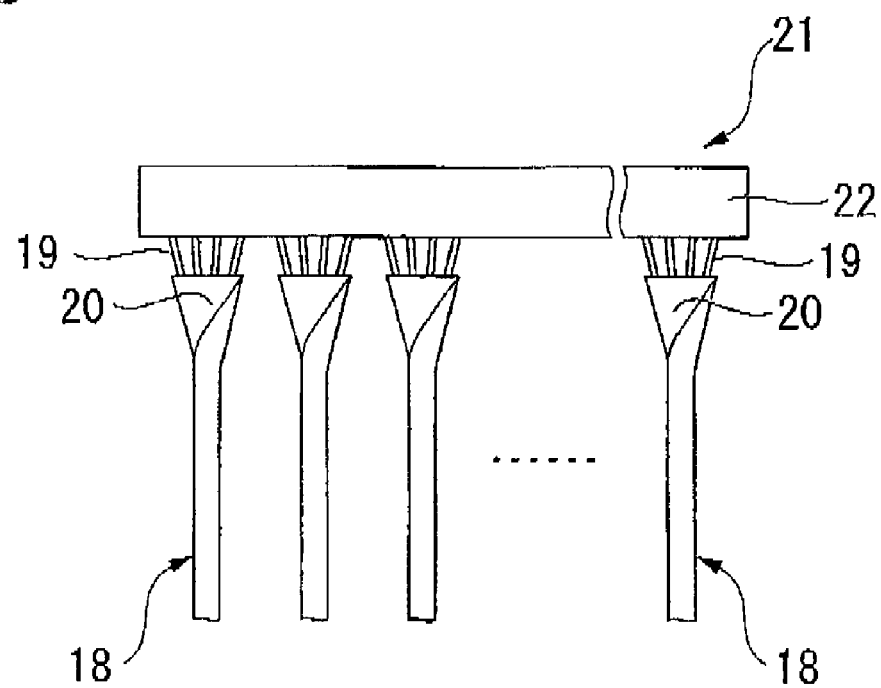
FIG. 4B is a perspective view of the connection portion of connector 22.
Figure 5:
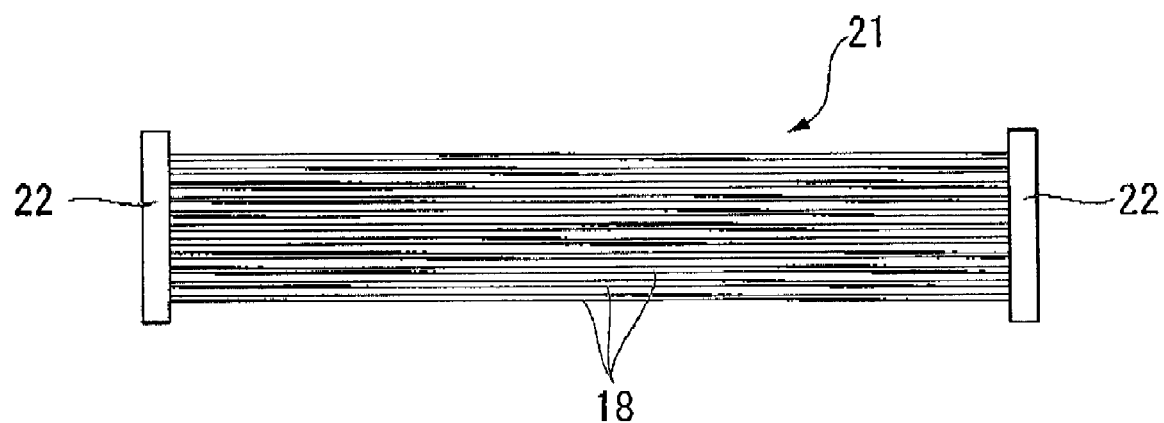
FIG. 5 illustrates a harness in which flat cables of equal length are employed.
Figure 6A:
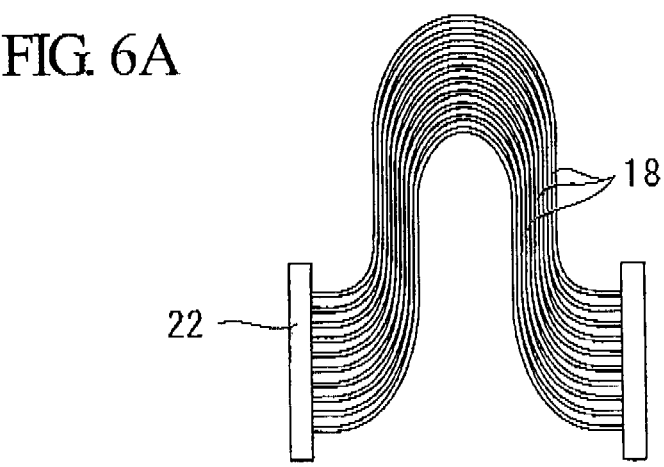
FIGS. 6A-C illustrate sliding wiring shapes for harnesses in which flat cables of equal length are employed.
Figure 6B:
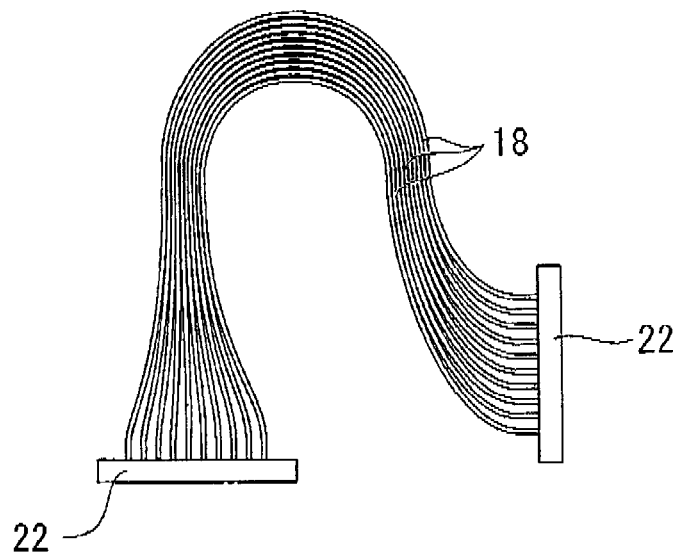
Figure 6C:
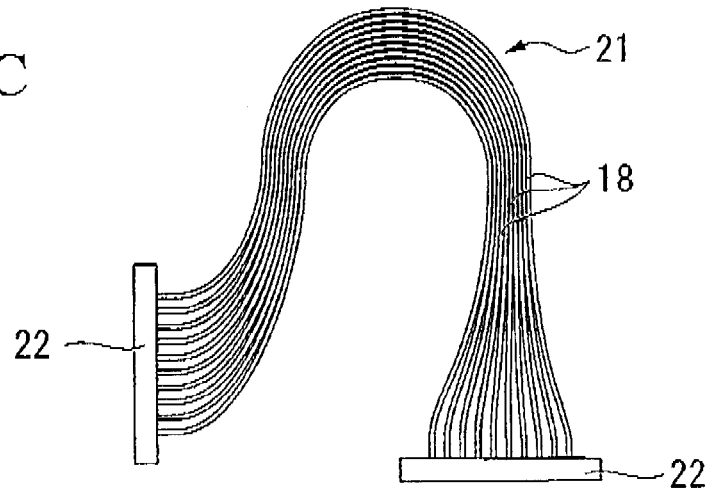
Figure 7:
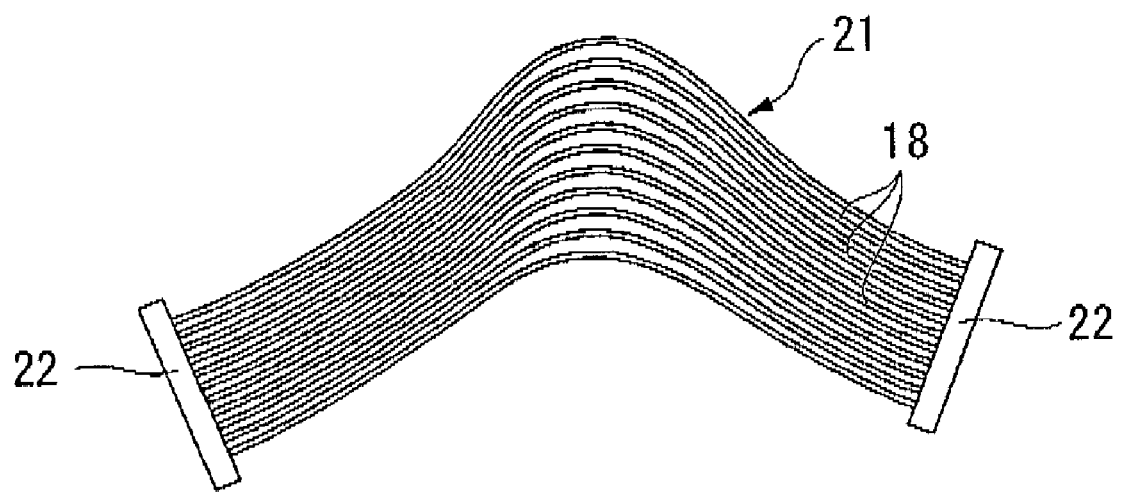
FIG. 7 illustrates a harness in which flat cables of different lengths are employed.
Figure 8A:
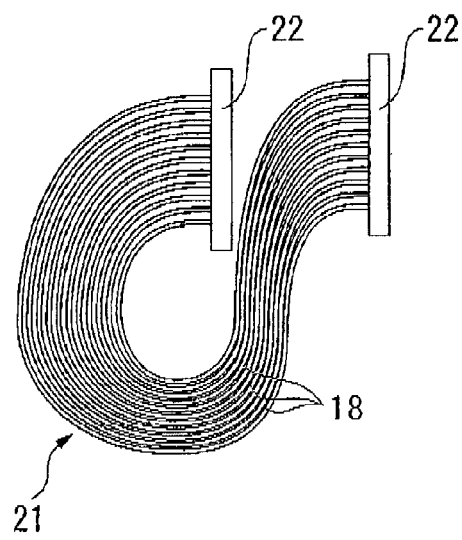
FIGS. 8A-D illustrate sliding wiring shapes for harnesses in which flat cables of different lengths are employed.
Figure 8B:
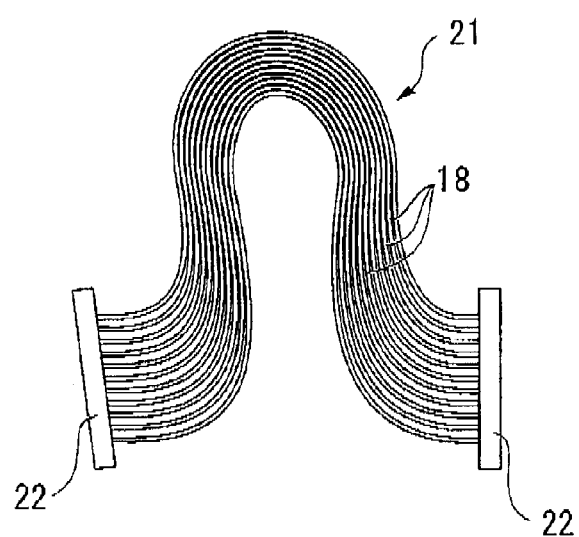
Figure 8C:
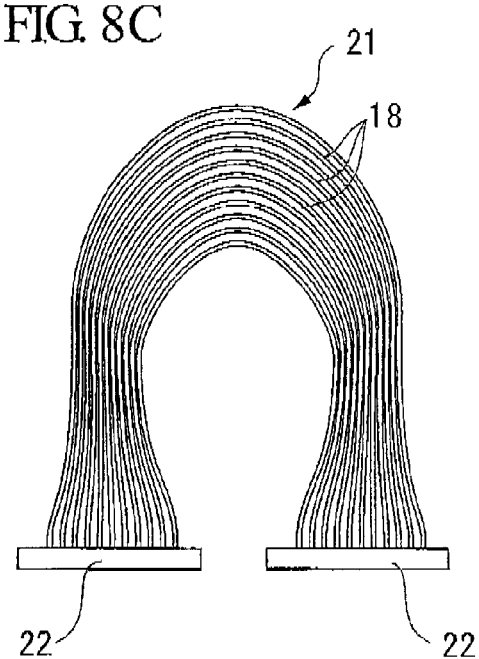
Figure 8D:
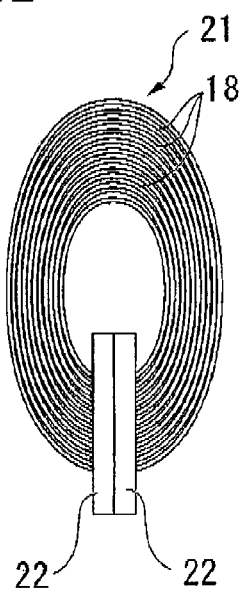
Figure 9:
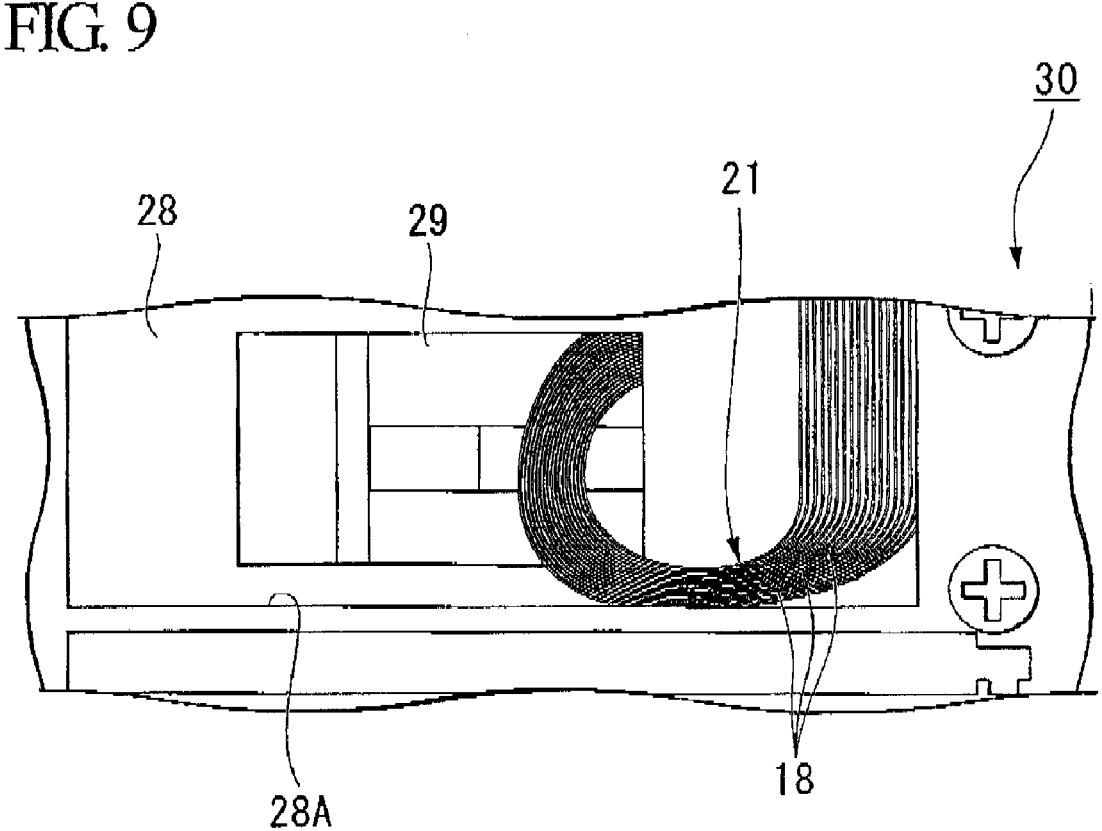
FIG. 9 is a plane view showing a state in which a harness 21 is used to wire enclosures of a sliding-type electronic device 30.

FIG. 3A is a front view of a harness 21 of an exemplary embodiment of the present invention, in which a plurality of flat cables 18 are stacked. FIG. 3B is a perspective view, and FIG. 3C is a cross-sectional view along line B-B' in FIG. 3A. FIG. 4A is a cross-sectional view of a flat cable 18, and FIG. 4B is a perspective view of a connection portion of a connector 22. Further, FIG. 5 illustrates a harness in which flat cables of equal length are employed, and FIGS. 6A-C illustrate the sliding wiring shapes of a harness in which flat cables of equal length are employed. FIG. 7 illustrates a harness in which flat cables of different lengths are employed, and FIGS. 8A-D illustrate the sliding wiring shapes of a harness in which flat cables of different lengths are employed. FIG. 9 is a plane view showing the state in which a harness 21 is used to wire enclosures in a sliding-type electronic device 30.

Similarly to FIG. 1 and FIGS. 2A-C, these figures are provided to explain the configuration of an exemplary embodiment of the present invention, and the sizes, thicknesses, dimensions and the like of the portions shown may be different from the dimensional relationships of actual harnesses and sliding-type electronic devices.

As shown in FIG. 9, the electronic device 30 of this embodiment is configured principally comprising two enclosures 28 and 29, having circuits, and a harness 21 comprising a plurality of layers of flat cables 18. The two enclosures 28 and 29 are slidably mounted, and each has connector connection portions (not shown). Connectors (not shown) are connected at both ends of the harness 21.

Further, one of the connectors of the harness 21 is connected to the connector connection portion of enclosure 29. The harness 21 is drawn out from an aperture portion provided in enclosure 28 and is bent into a U-shape at the sliding surface of the enclosures 28 and 29. The other connector is connected to the connector connection portion of the enclosure 28. Thus, the two enclosures 28 and 29 are electrically connected. Below, the configuration of each portion is explained in detail.

As shown in FIG. 3A and FIG. 3B, the harness 21 is configured from a plurality of flat cables 18, and a pair of connectors 22 mounted on the end portions of the plurality of flat cables 18. Near the connection portions of the connectors 22 of the harness 21, the distances between adjacent flat cables 18 are comparatively broad. Conversely, at a distance from the connection portions of the connectors 22, the distances between adjacent flat cables 18 are comparatively narrow. FIG. 3C shows that the flat cables are in a state of being stacked, with partial contact between the flat surfaces. The flat cables 18 are in the same order near connection portions of connectors 22 as portions in the stacked state, without adjacent cables crossing each other. The harness 21 has flexibility in the flat directions of the flat cables 18, and can be flexed smoothly in the stacked portion of the flat cables 18 as well.

As shown in FIG. 4A, the flat cables 18 are obtained by arranging four micro-coaxial cables 19 in parallel in a row, and covering with a covering member (sheath) 20 to obtain a flat cable. In this embodiment, the number of micro-coaxial cables is not limited to four, but can be selected freely according to the relation between the distance (height) between enclosures and the size (thickness) of the micro-coaxial cables.

Further, in this embodiment a configuration is shown in which only micro-coaxial cables 19 are used. However, the configuration of this embodiment is not limited thereto, and electrical feed wires, optical cables, and other cables other than coaxial cables may be combined with micro-coaxial cables to form a harness.

A micro-coaxial cable 19 comprises a central conductor, an inner insulating layer 24 surrounding the conductor, an outer conductor 25 surrounding this layer, and an outer covering (jacket) 26 surrounding the outer conductor. No limitations in particular are placed on the combination of the type of micro-coaxial cables 19 used and the direction of winding of the outer conductor. However, cable in which the size of the central conductor 23 is AWG 36 (American Wire Gauge) or smaller may be used, and cable which is AWG 42 or smaller may also be used.

Further, no limitations in particular are placed on the material of the inner insulating layer 24, but a fluoride resin may be used, and PFA (tetrafluoro ethylene/perfluoroalkyl vinyl ether copolymer, melting point 300° C.) may also be used. Also, no limitations in particular are placed on the material of the outer covering 26, but a fluoride resin may be used, and PFA or ETFE (ethylene/tetrafluoro ethylene copolymer, melting point 260° C.) may also be used.

As shown in FIG. 4A, the sheath 20 has a cross-section in an oval shape. The outer surfaces 20A and inner surfaces 20B of the pair of straight portions are both flat, and the cable shapes of the micro-coaxial cables 19 are not transferred thereto. At the contact portions 19a between mutually contacting adjacent micro-coaxial cables 19, there is no fusion between the outer coverings 26.

The sheath 20 constrains the micro-coaxial cables 19, and limits crossing of adjacent cables and other displacement. Also, at contact portions 20a of the sheath 20 with micro-coaxial cables 19, the cables and sheath 20 are in contact, but there is no fusion of resin members to each other.

In this embodiment, no resin of the sheath 20 or other material is used to fill a space between the sheath 20 and micro-coaxial cables 19, and gaps 27 exist. However, the configuration is not limited to that of this embodiment, and the space may be filled with a resin or other material which improves flexibility or flexing durability.

No limitations in particular are placed on the material of the sheath 20, but an ultraviolet-curing resin, fluoride resin, or similar may be used. Also ETFE (melting point 225° C.) may be used. A fluoride resin may be used due to the ease with which such a member can be formed into a thin shape. Also, such a material may be used due to the small friction resistance between the outer peripheral surface 20A and inner peripheral surface 20B of the sheath 20, so that flexibility of the stacked portion of a flat cable 18 is not impeded.

Table 1 shows the results of comparison of the characteristics of PFA and ETHE. As shown in Table 1, compared with PFA, ETFE has superior tensile strength and tensile elongation, and so the cable mechanical characteristics are improved compared with cases in which PFA is used as the sheath material.

No limitations in particular are placed on the method of coverage with the sheath 20, but four micro-coaxial cables 19 may be arranged in a row, and covered together by extrusion molding. Thus, a flat cable of micro-coaxial cables, which in the related art had been difficult to produce, can be obtained. No limitations in particular are placed on the thickness of the sheath 20, but a thickness in the range 10 to 50 μm may be used, and a thickness in the range 20 to 30 μm may also be used. If the thickness of the sheath 20 is in the range 10 to 50 μm, adequate flexibility of the flat cable 18 can be secured.

TABLE 1

|  | Units | ETFE | PFA |
|---|---|---|---|
| Melting point | deg C. | 225 | 302 to 310 |
| Tensile strength | MPa | 38 | 29 |
| Tensile elongation (20° C.) | % | 420 | 390 |

In an exemplary embodiment of the present invention, the difference in melting points between the resin used in the sheath 20 and the resin used in the outer covering 26 may be 30° C. or greater, and the difference may also be 50° C. or greater. If the melting point difference is 30° C. or greater, a CO2 laser or similar can be used in selective ablation of only the sheath 20 as shown in FIG. 4B, where the sheath 20 alone can be ablated and removed without causing fusion at the contact portion 20a between the sheath 20 and the outer covering 26. When ETFE is used in the sheath 20, ablation of the sheath 20 is possible even when the CO2 laser output is low, and so use of this material may be used from the standpoints of safety during operation and reduction of costs.

Figure 14:
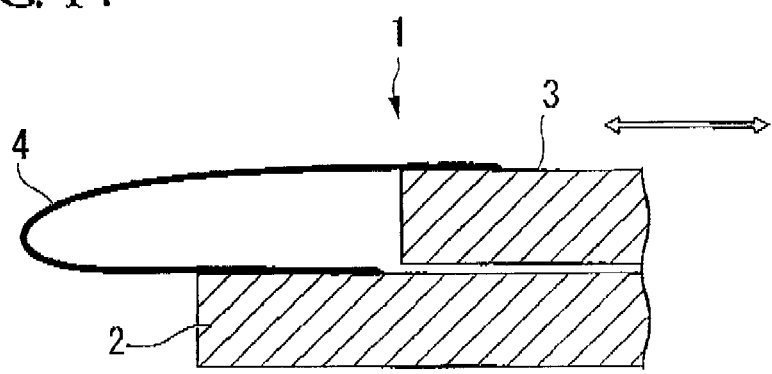
FIG. 14 is a cross-sectional view of an example of a case in which an FPC is used as a wiring member between enclosures in a sliding-type electronic device.

As shown in FIG. 4B, an exemplary embodiment of the present invention at contact portions between a connector 22 and flat cable 18, the sheath 20 is removed and the micro-coaxial cables 19 are exposed. Hence each individual cable can move easily, and wiring is possible to accommodate wiring intervals to the terminal pitch of the connector 22. The exposed portion of the micro-coaxial cables 19 may be approximately 3 mm in length, that this portion may be more easily bent than the flat cable portion 18, and that by bending the exposed portions through 90°, the direction of arrangement of micro-coaxial cables 19 in the connector 22, and the direction of arrangement of micro-coaxial cables 19 in the flat cables 18 in the stacked portions of the flat cables 18, can be made different by 90°. Further, flat cables 18 which are adjacent in positions separated from the vicinity of the connector 22 are in a stacked state such that the outer surfaces 20A of the sheaths 20 are superposed, as shown in exemplary embodiment in FIG. 3C. Consequently, there is no need to secure a flexing radius in the height direction as in the case of a pair of enclosures of the related art as shown in FIG. 14, and the flexing radius of the stacked portion of flat cables 18 at the sliding surface of the enclosures can be made sufficiently larger than the allowable bending radius.

As shown in an exemplary embodiment of the present invention in FIG. 5, a plurality of flat cables 18 of equal length may be used in the harness 21, or, as shown in an exemplary embodiment in FIG. 7, a plurality of flat cables 18 of unequal lengths may be used. Hence when applying a harness 21 to enclosures with a sliding-type construction, equal wiring lengths of the flat cables 18, or modified lengths, may be selected as appropriate according to the position and orientation of the connector connection portions. As shown in FIGS. 6A-C and FIGS. 8A-D, the stacked portion of the flat cables 18 can be bent into a U shape, and a sliding wiring shape can be adopted which accommodates the combination of the draw-out directions of the pair of connectors 22.

As shown in an exemplary embodiment of the present invention in FIG. 9, when wiring the harness 21 within enclosures of a sliding-type electronic device 30, either a plurality of flat cables 18 of equal length, or a plurality of flat cables 18 of unequal lengths, are selected for use in the harness 21, depending on the directions of the connector connection portions (not shown) in the enclosures 28 and 29. The connector 22 at one end of the harness 21 is mounted on the connector connection portion (not shown) of enclosure 29. The wires are drawn out from an aperture portion of the enclosure 28, and the stacked portion of the flat cables 18 constituting the harness 21 are positioned, bent into a U shape, at the sliding surface, the width direction of which is stipulated by the inner wall (not shown) of the enclosure 29 and the inner wall 28A of the enclosure 28. The connector 22 at the other end of the harness 21 is mounted on the connector connection portion (not shown) of the enclosure 28. Thus, when the enclosure 29 is slid relative to the enclosure 28, the stacked portion of the flat cables 18 can flex with a large bending radius equal to or greater than the allowed bending radius.

Figure 10:
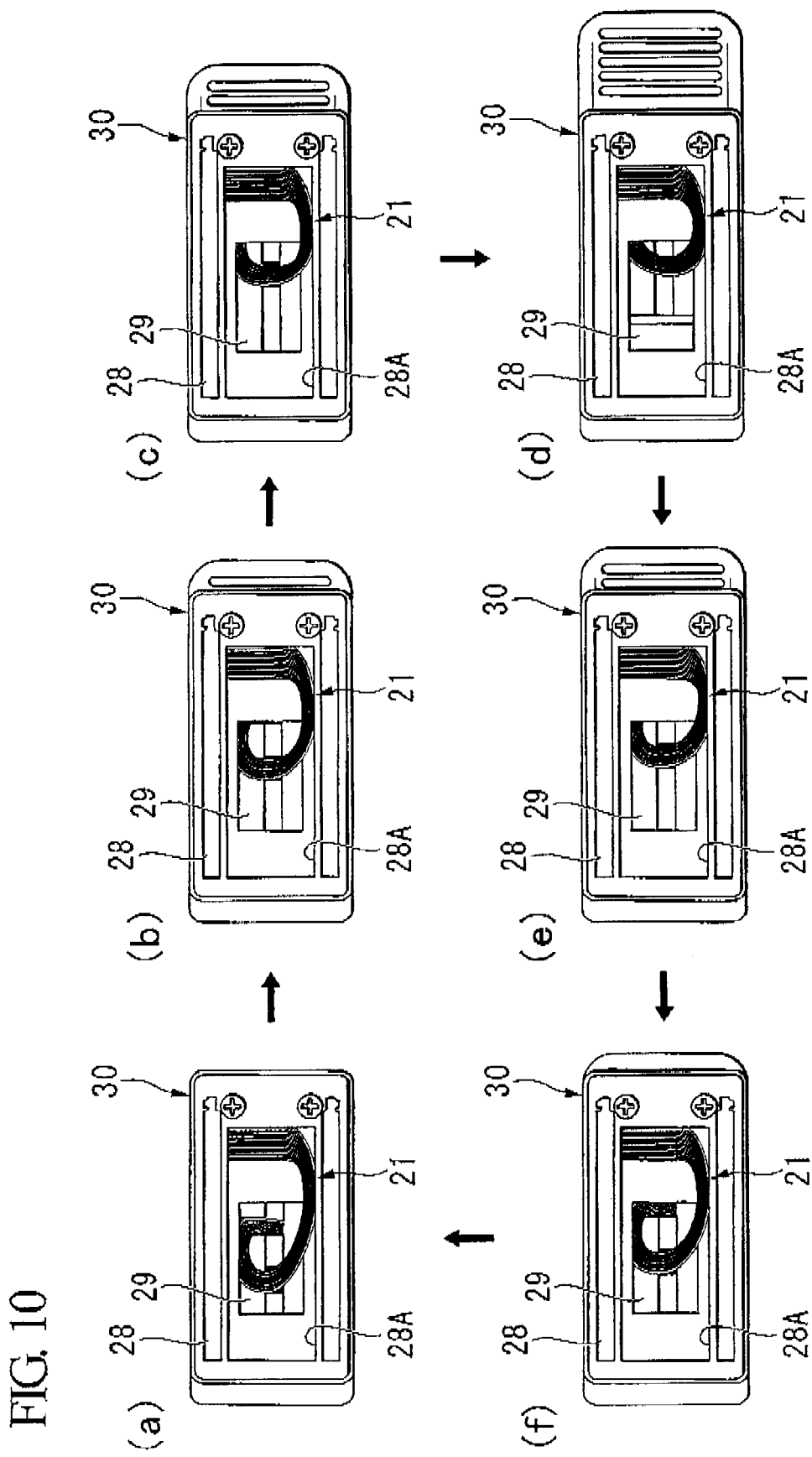
FIG. 10 is a plane view showing the order of shape change of the stacked portion of the flat cables 18 during enclosure sliding in the electronic device 30 of a third embodiment.

FIG. 10 is a plane view showing in order the change in shape of the stacked portion of flat cables 18 during enclosure sliding of the electronic device 30. FIG. 10(a) illustrates a state in which enclosure 29 overlaps enclosure 28. FIG. 10(b) and FIG. 10(c) illustrate states in which enclosure 29 is gradually pulled out from enclosure 28, and FIG. 10(d) illustrates a state in which enclosure 29 is completely pulled out from enclosure 28. FIG. 10(e) and FIG. 10(f) illustrate states in which enclosure 29 is pushed back to enclosure 28, to finally return once again to FIG. 10(a).

In the electronic device 30 of this embodiment, the stacked portion of the flat cables 18 is positioned, bent into a U shape, at the sliding surface of the enclosure 28 and enclosure 29, so that the portion of the stacked portion of the flat cables 18 which is bent into a U shape is gradually displaced according to the sliding of enclosure 29 relative to enclosure 28. Hence there is no occurrence of bending at radii smaller than the allowed bending radius of the cables in the width direction stipulated by the inner wall (not shown) of enclosure 29 and the inner wall 28A of enclosure 28.

As previously explained, by means of the electronic device 30 of an exemplary embodiment, advantageous effects similar to those of the above-described electronic devices of the an exemplary embodiment can be obtained.

Further, to address the constant of the height between enclosures, the width of the flat cables can be adjusted by selecting the diameters and number of the micro-coaxial cables, and a plurality of flat cables can be stacked and arranged in a row. Consequently in wiring of 40 conductors used in ordinary portable telephones, by forming flat cables of wiring and stacking flat cables, it is possible to maintain the wiring order, and accommodation in the space of a height of 3 mm of the enclosures is possible.

Further, by using a harness 21 in which a plurality of layers of flat cables 18 are in a stacked state, the direction of arrangement in a row of micro-coaxial cables at a conductor, and the direction of arrangement in a row within the flat cables, can be changed by 90°, so that the stacked portion of the flat cables 18 can be positioned in a state of being bent into a U shape on the enclosure sliding surface. Hence when sliding an enclosure, there is no need for the stacked portion of flat cables to be flexed in the space which is 3 mm in the height direction of the enclosures, as in the wiring pattern of FIG. 14, and flexing is possible with a large radius of curvature equal to or greater than the allowable bending radius of 5 mm in the enclosure width direction. As a result, the 100,000 or more flexing cycles required for portable telephones can be satisfied.

Moreover, by arranging a plurality of micro-coaxial cables in a row, and using extrusion molding to cover the cables together, a flat cable of micro-coaxial cables can be formed. Hence a micro-coaxial cable assembly is made possible, and compared with cases of the related art in which FPCs are used as wiring members between enclosures, transmission characteristics and noise resistance can be improved.

Also, by using a fluoride resin in the outer covering 26 and the sheath 20 of the micro-coaxial cables 19, slipping is improved at the contact portions 19a between micro-coaxial cables 19 and at contact portions 20a between micro-coaxial cables 19 and sheath 20, so that flexibility of the flat cable 18 as a whole can be improved.

Further, because the outer surfaces 20A and inner surfaces 20B of the sheaths 20 are planar and flat, flexibility of individual flat cables 18 can be improved, and moreover flexibility of a plurality of stacked flat cables 18 can be improved.

Also, by using in the sheath 20 a resin having a lower melting point than the resin used in the outer covering 26 of the micro-coaxial cables 19, a $CO_2$ laser can be used in ablation of only the sheath 20. The sheath 20 can easily be ablated and removed, and the micro-coaxial cables 19 can be exposed, so that connection to a connector 22 can easily be performed, and wires can easily be twisted.

Figure 11:
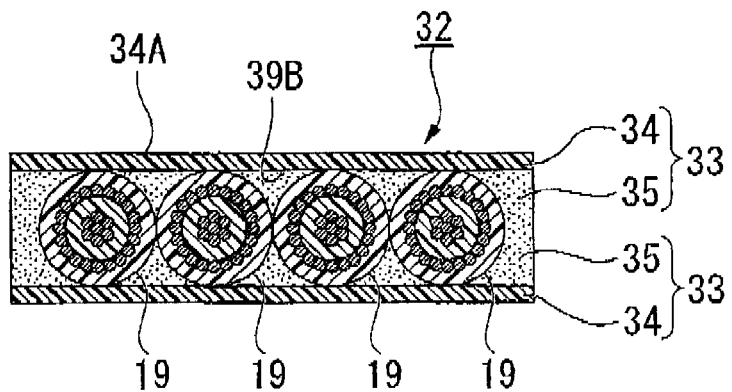
FIG. 11 is a schematic cross-sectional view of flat cables constituting the harness of the third embodiment.

FIG. 11 is a schematic cross-sectional view of a flat cable constituting a harness of an exemplary embodiment of the present invention. The sizes, thicknesses, and other dimensions of each portion shown may be different from the dimensional relationships of actual harnesses.

In this embodiment, the construction of flat cables 32 constituting the harness of the present invention (not shown) is different from the construction of the flat cables in the previously described embodiments; otherwise the configuration of the harness and of the sliding-type electronic device is the same as in the previous embodiment. Hence the flat cables 32 of this embodiment are explained in detail below, and explanations of portions which are the same as in the previous embodiment are omitted.

FIG. 11 shows an exemplary embodiment of the present invention, where the flat cables 32 are formed by arranging four micro-coaxial cables 19 in parallel in a row, and enclosing the cables from both sides with resin tape 33 to form a flat cable. In this embodiment also, similarly to the second embodiment, the number of micro-coaxial cables is not limited to four, but can be freely selected.

A resin tape 33 comprises resin film 34 and adhesive material 35. The resin film 34 has a flat cross-sectional shape, and the outer surfaces 34A and inner surfaces 34B of both sides of linear portions are all flat. The cable shapes of the micro-coaxial cables 19 are not transferred to the resin film 34. The adhesive material 35 fills the gap between the resin films 34 and the micro-coaxial cables 19, so that the micro-coaxial cables 19 are constrained, and cannot cross over adjacent cables. Also, the resin films 34 and micro-coaxial cables 19 are bonded together by the adhesive material 35. The outsides of the micro-coaxial cables 19 positioned on both ends are not covered by resin films 34, and the outside is filled only with the adhesive material 35.

No limitations in particular are placed on the material of the resin films 34; and PET or another general-purpose resin can be employed. A resin with excellent bending characteristics may be employed. No limitations in particular are placed on the thickness of the resin films, but a thickness in the range of 12 to 50 μm may be used.

No limitations in particular are placed on the adhesive material 35. However, in order to secure adhesion with the fluoride resin used in the outer covering 26 of the micro-coaxial cables 19, use of a silicon-based adhesive material or similar may be used. Also, use of a resin or similar which improves the flexibility and flexing resistance of the flat cables 32 may be used. No limitations in particular are placed on the thickness of the adhesive material 35, but a thickness in the range 10 to 30 μm may be used.

No limitations in particular are placed on the method used for covering with resin tape 33, but four micro-coaxial cables 19 may be arranged in a row, and lamination be used to cover the cables together. Thus, fabrication of a flat cable of micro-coaxial cables, which had been difficult in the related art, can be performed. No limitations in particular are placed on the overall thickness of the resin tape 33, but a thickness in the range 20 to 80 μm may be used, and a thickness in the range 30 to 50 μm may also be used. If the overall thickness of the resin tape 33 is between 30 and 50 μm, then adequate flexibility can be secured for the flat cables 32.

As previously explained, by means of a harness and a sliding-type electronic device using the flat cables 32 of this embodiment, advantageous effects similar to those of the previously described embodiments can be obtained.

Figure 12A:
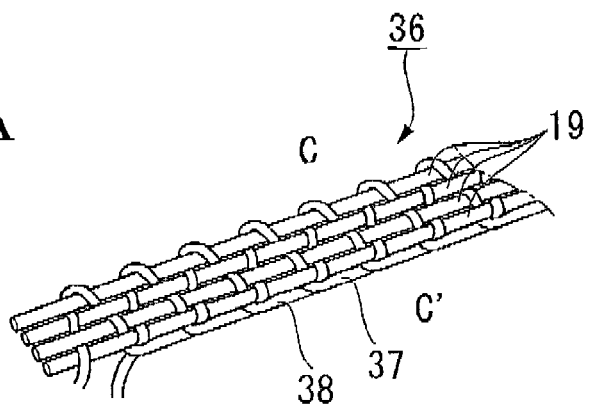
FIG. 12A is a perspective view of flat cables 36 constituting the harness of a fourth embodiment.
Figure 12B:
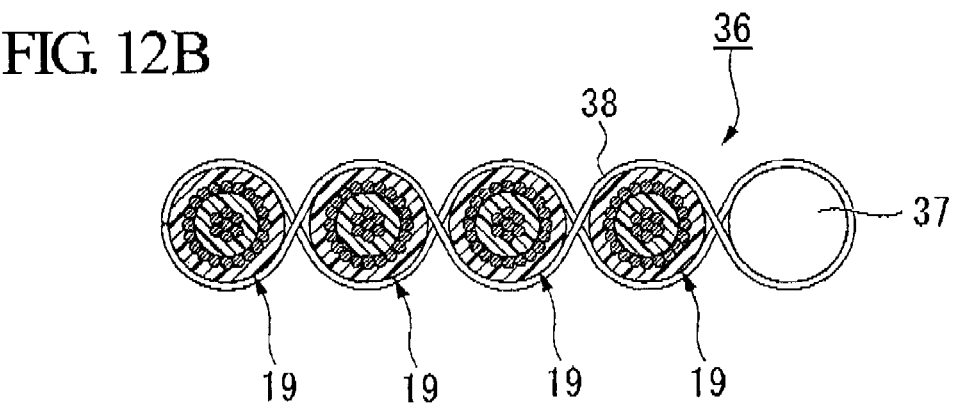
FIG. 12B is a cross-sectional view along line C-C' in FIG. 12A.
Figure 13A:
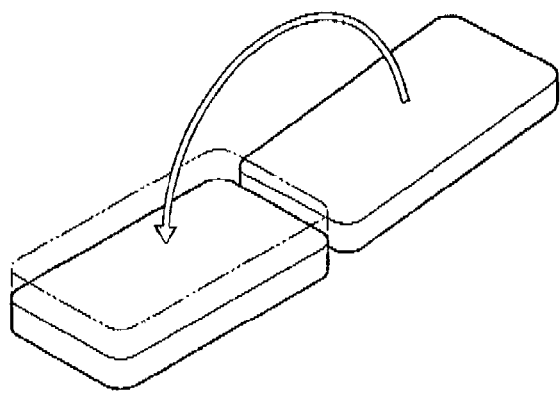
FIGS. 13A-D illustrate examples of housing displacement modes for a portable telephone, as an example of an electronic device.
Figure 13B:
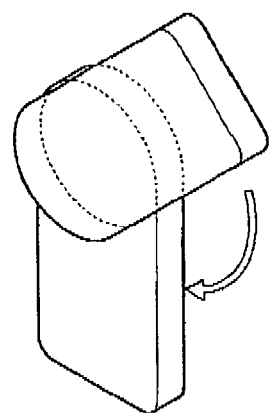
Figure 13C:
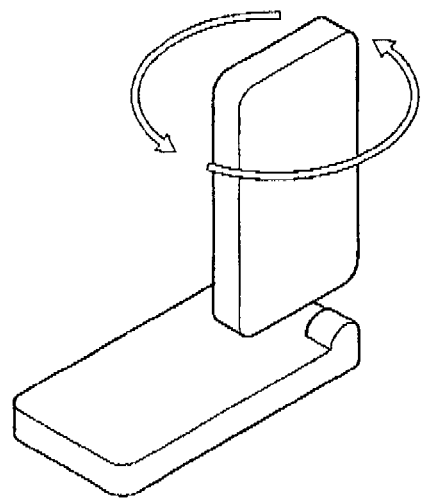
Figure 13D:
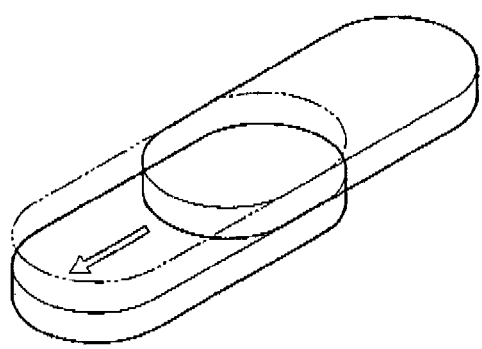

FIG. 12A is a perspective view of a flat cable 36 constituting a harness of this embodiment, and FIG. 12B is a cross-sectional view along line C-C' in FIG. 12A. The sizes, thicknesses, and other dimensions of each portion shown may be different from the dimensional relationships of actual harnesses.

In this embodiment, the construction of a flat cable 36 constituting the harness (not shown) differs from the construction of the flat cables of the previously described embodiments; otherwise the configurations of the harness and sliding-type electronic devices are the same as in the previous embodiments. Hence details of the flat cable 36 of this embodiment are explained below, and explanations of portions which are the same as in the second embodiment are omitted.

As shown in FIG. 12B, the flat cable 36 is formed by arranging four micro-coaxial cables 19 in a parallel row, and weaving binding fibers (hereafter called the "weft") 38 among the micro-coaxial cables, to obtain a flat cable. In this embodiment, similarly to the previous embodiments, no limitations in particular are placed on the number of micro-coaxial cables, which can be freely selected.

In weaving the weft 38 to obtain a flat cable, the plurality of micro-coaxial cables 19, arranged in a parallel row, are taken to be the warp, and the weft 38 is woven therewith. Hence at the surface of the flat cable 36 the micro-coaxial cables 19 and the weft 38 occur in alternation above and below, and the surface is not flat. Further, the micro-coaxial cables 19 are constrained by the weft 38, so that crossing over adjacent cables is not possible. Further, a wraparound fiber 37 is placed at one end of the plurality of micro-coaxial cables arranged in a parallel row, and by wrapping the weft 38 around this wraparound fiber, the micro-coaxial cables 19 formed into a flat cable do not become loose even if a weft thread breaks.

No limitations in particular are placed on the material of the weft 38 and wraparound fiber 37, but polyester or another resin thread may be used, and a resin with excellent wear resistance and durability may be used. No limitations in particular are placed on the diameter of the resin threads, but a diameter in the range 0.1 to 0.15 m may be used.

No limitations in particular are placed on the method of weaving of the resin threads, but a commercial cable fiber may be used, and that, using polyester resin, polyester resin thread be employed in weft wraparound method weaving. Thus, flat cable fabrication from micro-coaxial cables, which could not be performed easily and inexpensively in the related art, becomes possible, and adequate flexibility can be secured for the flat cables 36.

As previously explained, by means of a harness and a sliding-type electronic device using the flat cable 36 of this embodiment, advantageous effects similar to those of the above-described embodiments may be obtained.

EXAMPLES

Below, embodiments are employed to further clarify advantageous effects of the invention. The present invention is not limited to the following embodiments, and appropriate modifications can be made without changing the sprit thereof.

Example 1

AWG 46 micro-coaxial cables with an outer diameter of 0.24 mm were used. Four cables were arranged in a parallel row, and the extrusion method was used to cover the cables together with a fluoride resin. A flat cable with the construction shown in FIG. 2B was fabricated. The dimensions of this flat cable were 1.2 mm width, 0.3 mm thickness, for space conservation.

A cable of a length of 80 mm was connected to connection portions (connectors), to fabricate a harness with the construction shown in FIG. 2A.

As shown in FIG. 1, in this harness, each of the connectors was wired while being shifted 12.4 mm in the direction perpendicular to the enclosure sliding direction. The cable bending radius at this time was 5 mm or greater. The cable accommodation height of the sliding portion was 3 mm.

In this state, the enclosures were slid continuously, the cable was flexed, and the number of sliding cycles until wire breaking was investigated. Sliding tests were conducted under the conditions of a sliding interval of 30 mm and a speed of 30 cycles/minute.

As a result, no cable breakage occurred in the harness of this embodiment even when 100,000 or more sliding cycles were performed.

Example 2

The flat cables fabricated in Example 1 were stacked in 10 layers, to fabricate a harness employing 40 cores, used in ordinary portable telephones.

The harness obtained had a height a in FIG. 3C of 3 mm and a width b in FIG. 3C of 1.2 mm.

Similarly to Example 1, this harness was wired while each of the connectors was shifted 12.4 mm in the direction perpendicular to the enclosure sliding direction. The flat cable stacked portion of the harness was bent into a U shape at the sliding surface and wired, as shown in FIG. 9; the cable radius of curvature at this time was 5 mm or greater. Sliding tests similar to those of Example 1 were conducted for this wiring state.

As a result, no cable breakage occurred in the harness of this embodiment even when 100,000 or more sliding cycles were performed.

Example 3

AWG 46 micro-coaxial cables with an external diameter of 0.24 mm were used. As the laminating tape, a PET (polyethylene terephthalate) tape with a silicon-based adhesive was used. Four of the cables were arranged in parallel in a row, and a lamination method was used to cover the cables together, to fabricate flat cables with the construction shown in FIG. 11. The dimensions of the flat cables were 1.2 mm wide and 0.37 mm thick, for space conservation.

Flat cables thus fabricated were stacked in 10 layers, to fabricate a harness employing 40 cores, used in ordinary portable telephones.

The harness obtained had a height a in FIG. 3C of 4 mm and a width b in FIG. 3C of 1.2 mm.

Similarly to Example 1, this harness was wired while each of the connectors was sifted 12.4 mm in the direction perpendicular to the enclosure sliding direction. The flat cable stacked portion of the harness was bent into a U shape at the sliding surface and wired, as shown in FIG. 9; the cable radius of curvature at this time was 5 mm or greater. Sliding tests similar to those of Example 1 wore conducted for this wiring state.

As a result, no cable breakage occurred in the harness of his embodiment even when 100,000 or more sliding cycles were performed.

Example 4

AWG 46 micro-coaxial cables with an external diameter of 0.24 mm were used. As the weft fibers, 50-denier polyester fibers were used. Four of the cables were arranged in parallel in a row, a wraparound fiber was also placed in parallel at one end of the cables, and the weft fibers were woven with the cables, to fabricate flat cables with the construction shown in FIG. 12. The dimensions of the flat cables were 2.25 mm wide and 0.6 mm thick, for space conservation.

Flat cables thus fabricated were stacked in 10 layers, to fabricate a harness employing 40 cores, used in ordinary portable telephones.

The harness obtained had a height a in FIG. 3C of 6 mm and a width b in FIG. 3C of 2.25 mm.

Similarly to Example 1, this harness was wired while each of the connectors was shifted 12.4 mm in the direction perpendicular to the enclosure sliding direction. The flat cable stacked portion of the harness was bent into a U shape at the sliding surface and wired, as shown in FIG. 9; the cable radius of curvature at this time was 5 mm or greater. Sliding tests similar to those of Example 1 were conducted for this wiring state.

As a result, no cable breakage occurred in the harness of this embodiment even when 100,000 or more sliding cycles were performed.

Comparative Example

AWG 46 micro-coaxial cables with an external diameter of 0.24 mm were used. 40 cores were arranged in parallel in a row, and were taped to fabricate a flat cable; and as shown in FIG. 8, wiring was performed such that the line connecting the connectors was parallel to the enclosure sliding direction. The cables of the harness were flexed within the cable accommodation height (3 mm) of the sliding portion, and the cable radius of curvature at this time was 1.5 mm.

In this state, sliding tests similar to those of Example 1 were conducted. As a result, breakage of the cable of the comparative example occurred after an average (n=3) of 11,254 cycles.

While exemplary embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An electronic device, comprising:
   at least a first enclosure and a second enclosure, mounted so as to enable relative displacement therebetween, said first enclosure being slidable with respect to said second enclosure along a plane; and
   an electric wire which electrically connects a circuit for said first enclosure and a circuit of said second enclosure, wherein:
   said electric wire comprises at least one tape-shaped flat cable comprising a plurality of internal conductors arranged in parallel in a row; and
   said at least one flat cable has a cross-section having a U shape, the cross-section being taken in the same plane along which said first enclosure is slidable with respect to said second enclosure or in a plane parallel to the same plane along which said first enclosure is slidable with respect to said second enclosure, such that one end of said at least one flat cable does not overlap the other end of said at least one flat cable,
   wherein in a portion of said at least one flat cable bent into said U shape, said internal conductors of said at least one flat cable are aligned with one another along a direction substantially perpendicular to said plane along which said first enclosure is slidable with respect to said second enclosure.

2. The electronic device according to claim 1, wherein at least one of said internal conductors is a micro-coaxial cable.

3. The electronic device according to claim 1, wherein said electric wire further comprises a cover, covering said plurality of internal conductors together in a tape shape.

4. The electronic device according to claim 1, wherein said at least one flat cable further comprises a resin covering member, covering said plurality of internal conductors.

5. The electronic device according to claim 1, wherein said at least one flat cable further comprises a pair of resin tapes, wherein said plurality of internal conductors is enclosed between said pair of resin tapes, thus covering said internal conductors together.

6. The electronic device according to claim 1, wherein said at least one flat cable farther comprises a resin binding fiber woven with said plurality of internal conductors thus binding said plurality of internal conductors together.

7. The electronic device according to claim 1, wherein a first internal conductor on a first side of said electric wire has a length less than a length of a second internal conductor on a second, opposite side of said electric wire, and wherein internal conductors between said first internal conductor and said second internal conductor are of increasing lengths from said first side to said second side.

8. The harness according to claim 1, further comprising a first connector which connects the electric wire to the first enclosure and a second connector which connects the electric wire to the second enclosure, and
wherein in a portion of the at least one flat cable that is connected to the first connector, the internal conductors of the at least one flat cable are aligned with one another along the plane, and in a portion, of the at least one flat cable that is connected to the second connector, the internal conductors of the at least one tape-shaped flat cable are aligned with one another along the plane.

9. The farness according to claim 1, wherein the at least one flat cable having the U-shape includes a pair of legs, and the first enclosure slides relative to the second enclosure in a same direction n which the legs of the U-shape extend.

10. An electronic device comprising:
at least a first enclosure and a second enclosure, mounted so as to enable relative displacement therebetween, said first enclosure being slidable with respect to said second enclosure along a plane; and
an electric wire which electrically connects a circuit for said first enclosure and a circuit of said second enclosure, wherein;
said electric wire comprises at least one tape-shaped flat cable comprising a plurality of internal wires arranged in parallel in a row; and
said at least one flat cable has a cross-section having a U shape, the cross-section being taken in the same plane along which said first enclosure is slidable with respect to said second enclosure or in a plane parallel to the same plane along which said first enclosure is slidable with respect to said second enclosure, such that one end of said at least one flat cable does not overlap the other end of said at least one flat cable,
wherein said electric wire comprises a plurality of tape-shaped flat cables superposed in a plurality of layers.

11. The electronic device according to claim 10, wherein said flat cables superposed in a plurality of layers each have a cross-section having a U-shape, the cross-section being taken in the same plane along which said first enclosure is slidable with respect to said second enclosure.

12. The electronic device according to claim 10, wherein, said plurality of flat cables are of equal length.

13. The electronic device according to claim 10, wherein, first internal conductors on a first side of said electric wire have a length less than a length of second internal conductors on a second, opposite side of said electric wire, and wherein internal conductors between said first internal conductors and said second internal conductors are of increasing length from said first side to said second side.

14. A harness for wiring electronic devices, comprising:
an electric wire comprising at least one tape-shaped flat cable bent into a U shape, comprising a plurality of internal conductors;
a first connection portion at a first end of said electric wire; and
a second connection portion at a second end of said electric wire, wherein:
the first connection portion slides relative to the second connection portion along a plane, and
said first connection portion and said second connection portion are arranged so as not to overlap when viewed from the plane, and
in a portion of said at least one tape-shaped flat cable bent into said U shape, said internal conductors of said at least one flat table are aligned with one another along a direction substantially perpendicular to said plane along which said first enclosure is slidable with respect to said second enclosure.

15. The harness according to claim 14, wherein the electric wire comprises a plurality of tape-shaped flat cables.

16. The harness according to claim 14, wherein at the first end of the electric wire the internal conductors of the at least one tape-shaped flat cable are aligned with one another along the plane, and at the second end of the electric wire the internal conductors of the at least one tape-shaped flat cable are aligned with one another along the plane.

* * * * *